United States Patent [19]

Burn

[11] Patent Number: 4,855,266

[45] Date of Patent: Aug. 8, 1989

[54] HIGH K DIELECTRIC COMPOSITION FOR USE IN MULTILAYER CERAMIC CAPACITORS HAVING COPPER INTERNAL ELECTRODES

[75] Inventor: Ian Burn, Hockessin, Del.

[73] Assignee: E. I. Du Pont de Nemours and Company, Wilmington, Del.

[21] Appl. No.: 161,238

[22] Filed: Feb. 18, 1988

Related U.S. Application Data

[63] Continuation-in-part of Ser. No. 3,260, Jan. 13, 1987, abandoned.

[51] Int. Cl.$^4$ .................. H01G 4/12; C04B 35/48; C04B 35/49
[52] U.S. Cl. .................. 501/138; 501/139; 252/520; 361/321
[58] Field of Search .................. 501/137–139; 252/520

[56] References Cited

U.S. PATENT DOCUMENTS

| | | | |
|---|---|---|---|
| 3,977,887 | 8/1976 | McIntosh | 501/137 |
| 4,106,075 | 8/1978 | Baumann et al. | 501/137 |
| 4,283,753 | 8/1981 | Burn | 501/137 |
| 4,642,732 | 2/1987 | Ikeda et al. | 501/138 |

FOREIGN PATENT DOCUMENTS

| | | | |
|---|---|---|---|
| 2835861 | 3/1979 | Fed. Rep. of Germany | 501/137 |
| 51-76597 | 7/1976 | Japan | 501/137 |
| 52-70398 | 6/1977 | Japan | 501/137 |
| 59-152265 | 8/1984 | Japan | 501/137 |
| 59-154703 | 9/1984 | Japan | 501/137 |
| 59-154704 | 9/1984 | Japan | 501/137 |
| 60-97508 | 5/1985 | Japan | 501/137 |
| 1028644 | 7/1983 | U.S.S.R. | 501/137 |
| 2143227 | 2/1985 | United Kingdom | 501/137 |

OTHER PUBLICATIONS

Bonsack, James P., *Amer. Ceram. Soc. Bull.*, 50 (1971), pp. 488–492.

*Primary Examiner*—William R. Dixon, Jr.
*Assistant Examiner*—Andrew Griffis

[57] ABSTRACT

A dielectric composition is claimed consisting essentially of a donor- and acceptor-doped $BaTiO_3$ having an intergranular phase of flux containing both glass-forming and glass-modifying ions. that can be co-fired in a low oxygen-containing atmosphere for the manufacture of multilayer capacitors having copper internal electrodes.

10 Claims, No Drawings

HIGH K DIELECTRIC COMPOSITION FOR USE IN MULTILAYER CERAMIC CAPACITORS HAVING COPPER INTERNAL ELECTRODES

CROSS-REFERENCE TO RELATED APPLICATION

This is a continuation-in-part of co-pending U.S. patent application Ser. No. 003,260 filed Jan. 13, 1987, now abandoned.

FIELD OF THE INVENTION

The invention relates to ceramic compositions with dielectric constants above 5000 which are used in multilayer ceramic capacitors having internal copper electrodes.

BACKGROUND OF THE INVENTION

Because of its high conductivity and low cost, copper is an ideal metal for the internal electrodes in multilayer ceramic capacitors (MLCs). However, the use of copper electrodes in MLCs has been held back because of the following technical difficulties:

(a) the problem of reproducibly and reliably processing multilayer ceramic devices with many layers of copper electrodes and (b) the problem of achieving high dielectric constants for ceramic compositions which must sinter below the melting point of copper (1083° C.) and which also must be resistant to reduction in the atmospheres of low oxygen content that are needed to protect copper from oxidation when the multilayer ceramic/metal structure is fired.

As described in our co-pending U.S. patent application Ser. No. 003,259 filed Jan. 13, 1987, the processing of MLCs with many copper electrodes (e.g., 25) can be accomplished by the use of an electrode paste made with an appropriate acrylic binder and by firing the capacitors in an atmosphere which protects the copper from oxidation during firing, e.g., a mixture of nitrogen, carbon dioxide and hydrogen. Furthermore, ceramic compositions with dielectric constants (K) greater than 1000 suitable for use in MLCs with copper electrodes are described in U.S. Pat. No. 4,101,952. These compositions are based on alkaline earth titanates with additions of alkaline earth aluminoborate glass to achieve sintering at 900°-1080° C. The compositions are free from readily reducible oxides such as lead oxide, bismuth oxide and cadmium oxide and from volatile fluorides as well. Thus, they are chemically stable during the sintering process needed for MLCs with copper electrodes. However, the dielectric constant of these compositions is only as high as 4000, which is too low to provide adequate capacitance in the capacitors of small size normally used for decoupling and by-pass applications and meeting the A.E.I. specifications on temperature stability of Y5V or Z5U. Accordingly, there exists a substantial need for dielectric compositions which (1) are chemically stable and resistant to reduction, (2) can be sintered to a dense hermetic structure below the melting point of copper, and (3) have dielectric constants significantly higher than those which were achieved heretofore.

BRIEF DESCRIPTION OF THE INVENTION

In its primary aspect, the invention is directed to a dielectric composition having a dielectric constant above 5,000 consisting essentially of a donor- and acceptor-doped $BaTiO_3$ having an intergranular phase of flux containing both glass-forming and glass-modifying ions, characterized stoichiometrically by the following criteria:

(a) the ratio of A site ions to B site ions in the doped $BaTiO_3$, $$\frac{N_A + N_D^{3+}}{N_B + N_D^{5+} + N_C} = 1.02\text{-}1.10,$$

wherein
$N_A$ = number of divalent A site ions;
$N_B$ = number of tetravalent B site ions;
$N_C$ = number of acceptor ions; and
$N_D$ = number of donor ions of charge 3+ or 5+.

(b) the ratio of donor ions ($N_D$) to total cations ($N_T$), $N_D/N_T = 0.5\text{-}3.0\%$;

(c) $N_C/N_D$ is at least 0.20;

(d) the ratio of glass-forming ions ($N_G$) to total cations, $N_G/N_T = 0.5\text{-}3.5\%$; and (e) The ratio of the glass-modifying ions, $N_M$, to the total number of cations, $N_M/N_T = 1.5\text{-}5.0\%$.

In a second aspect, the invention is directed to a composition for preparing donor- and acceptor-doped $BaTiO_3$ having an intergranular layer of flux containing both glass-forming and glass-modifying ions by firing in a low oxygen-containing atmosphere consisting essentially of an admixture of finely divided particles of $BaTiO_3$, oxides of glass-forming cations, oxides of glass-modifying cations, A site dopant oxide(s), B site dopant oxide(s), oxides of donor ions and oxides of acceptor ions, characterized stoichiometrically by the following criteria:

(a) the molar ratio of A site oxide(s) to B site oxide(s) is 1.02-1.10;

(b) the molar ratio of donor oxide(s) to total oxide(s) is 0.5% to 3.0%;

(c) the molar ratio of acceptor oxide(s) to donor oxide(s) is at least 0.20;

(d) the molar ratio of glass-forming oxide(s) to total oxide(s) is 0.5% to 3.5%; and (e) the molar ratio of glass-modifying oxide(s) to the total oxide(s) is 1.5-5.0%.

In a third aspect of the invention, the oxides of A site dopant ions, B site dopant ions, oxides of donor ions and oxides of acceptor ions which are admixed with barium titanate in the above mentioned composition are incorporated in the barium titanate during its manufacture.

In a still further aspect, the invention is directed to ceramic multilayer elements comprising a plurality of internal conductive layers consisting essentially of copper made by firing the above mentioned composition in a low oxygen containing atmosphere.

PRIOR ART

U.S. Pat. No. 4,101,952, Burn

This patent is directed to low-firing monolithic ceramic capacitors having a K value of greater than 1000 in which the dielectric layers consist of 5-15% noncrystalline glass (alkaline earth aluminoborate glass) and 95-85% of a crystalline phase (alkaline earth metal titanate) and the electrodes are made of base metal.

U.S. Pat. No. 4,234,367, Herron et al.

The Herron et al. patent is directed to a method of forming glass ceramic composite structures with copper metallurgy (1) by printing a copper conductor pattern on a green sheet of a crystallizable glass, (2) laminating a second crystallizable glass green sheet on the printed copper pattern, and (3) firing the composite structure first in $H_2/H_2O$ to burn out the binder and then in an inert atmosphere to sinter the glass.

U.S. Pat. No. 4,283,753, Burn

This patent to Burn contains criteria for such variables as donor/acceptor balance, cation stoichiometry and glass composition in High K Dielectric Compositions based on $BaTiO_3$ which are cofired in air with Ag-Pd electrodes. The patent does not, however, teach those criteria for dielectric compositions which are cofired with copper electrodes in a low-oxygen atmosphere. The reference is silent with respect to the ratio of A site ions to B site ions and discloses only dielectric compositions in which the ratio is less than one. The ratio of acceptor ions to donor ions is not mentioned.

U.S. Pat. No. 4,308,570, Burn

This third Burn patent is directed to monolithic ceramic capacitors with copper internal electrodes having a K value of about 10 consisting of 10–50% wt. nonreducible glass (alkaline earth borate) and 90–50% wt. nonreducible crystalline ceramic phase ($MgTiO_3$).

U.S. Pat. No. 4,551,357, Takeuchi

This patent is directed to a process for making ceramic circuit boards by which a Cu/polymer paste is printed on a dielectric green sheet. The organic binder of the Cu paste is thermally more stable than the organic binder of the dielectric. The printed green sheet is heated in an oxidizing atmosphere below the decomposition point of the organic binder and then fired in a low oxygen-containing atmosphere to decompose the organic material.

U.S. Pat. No. 4,610,968, Wada et al.

A low temperature sinterable ceramic dielectric composition comprising (a) 100 parts of $BaTiO_3$ doped with 0.02 to 0.05 mole Mg, Zr or Ca and (b) 0.2–10 parts of $B_2O_3$ and a metal oxide selected from BaO, MgO, ZnO, BaO and CaO.

U.S. Pat. No. 4,610,971, Wada et al.

A low temperature sinterable ceramic dielectric composition comprising (a) 100 parts of $BaTiO_3$ doped with 0.02–0.05 mole Mg, Zn, Sr or Ca and (b) 0.2–10 parts $B_2O_3$ or $SiO_2$.

U.S. Pat. No. 4,610,969 and 4,610,970, Wada et al.

A low temperature sinterable ceramic dielectric composition comprising (a) 100 parts of $BaTiO_3$ doped with 0.02–0.05 mole Mg, Zn, Sr or Ca and (b) 0.2–10 parts of a mixture of $Li_2O$ and $SiO_2$.

U.S. Pat. No. 4,642,732, Ikeda et al.

The Ikeda patent discloses dielectric compositions which meet the EIA specifications for High K Dielectrics, but only for compositions in which K is less than 5000. The compositions taught by Ikeda, which do have K values above 5000, do not meet EIA specifications.

JA No. 59-154703, Murata (Assionee)

The patent discloses $BaTiO_3$ compositions containing 1.0–2.5 pbw $Nb_2O_5$, 0.1–0.8 pbw $Ca_2O_3$, 0.1–1.2 pbw $Si_2O$ and 0.3–1.0 pbw rare earth oxide selected from $Nd_2O_3$, $La_2O_3$, $Pr_6O_{11}$ and mixtures thereof. The compositions are fired in air at 1190°–300° C. and have K values less than 4600.

EPO No. 0164841

This reference is directed to ceramic dielectric compositions on electrically insulating glass, organic binder and an inorganic peroxide to facilitate burnout of the binder.

DETAILED DESCRIPTION OF THE INVENTION

A. Definitions

Reducible Oxides: As used herein, the term "Reducible Oxides" means metal oxides or their precursors which have a metal/metal oxide equilibrium oxygen pressure greater than $1 \times 10^{-9}$ atmosphere at 1050° C. In accordance with this definition, metal oxides such as PbO, $Bi_2O_3$ and CdO, which have a Gibbs free energy of formation ($\Delta F°$) with less negativity than $-30$ kcal/mole per moiety of oxygen in the molecule are Reducible Oxides.

Donor and Acceptor Ions: As used herein, the terms "donor ion" and "acceptor ion" are used in the same manner as they are used in Burn, U.S. Pat. No. 4,283,753 and in Herbert, J. M., "Ceramic Dielectrics and Capacitors", Gordon and Breach, 1985, p. 23.

High K Dielectric Composition: As used herein, the term "High K Dielectric Composition" refers to dielectric compositions meeting the following specifications of the Electronics Industries Association (EIA): DF below 4.0%, IR above $1 \times 10^{11}$ ohms or above 1000 ohm.farads, whichever is less.

B. Dielectric Composition

The dielectric compositions of the invention are based on barium titanate and are free from fluorides and reducible oxides or their precursors. Donor dopants selected from pentavalent ions such as niobium or tantalum and from trivalent rare earth ions such as neodymium are used together with zirconium oxide as Curie temperature depressors, despite the fact it is well known that donor dopants increase the tendency of titanate dielectrics to become semiconducting when heated in atmospheres of low oxygen content. Low sintering temperatures are achieved by the additions of a small amount of flux consisting of a glass-forming oxide, such as boron oxide, together with zinc oxide and/or lithium oxide as modifiers. The flux may also include aluminum oxide and/or an alkaline earth oxide such as barium oxide. In addition, an acceptor dopant, such as manganese oxide, must also be present in the barium titanate or added with the flux. High dielectric constant and high resistivity (absence of semiconduction) are achieved by arranging simultaneously (a) partial compensation of the donor dopants with acceptors and (b) precise balance of cation stoichiometry according to certain requirements which have been discovered.

We define the constituents of the dielectric composition as follows:

$N_A$=Number of divalent A site ions ($Ba^{2+}$, $Ca^{2+}$, $Sr^{2+}$);

$N_B$=Number of four valent B site ions ($Ti^{4+}$, $Zr^{4+}$);

$N_D$=Number of donor ions ($Nb^{5+}$, $Nd^{3+}$, etc.);

$N_C$=Number of donor compensating (acceptor) ions ($Mn^{2+}$, $Mn^{3+}$, $Co^{2+}$, etc.)

$N_G$=Number of glass forming ions ($B^{3+}$, $Si^{4+}$, $Ge^{4+}$, $P^{5+}$, etc.)

$N_M$=Number of flux modifier ions ($Li^+$, $Zn^{2+}$) and $$S = \frac{N_A + N_D^{3+}}{N_B + N_D^{5+} + N_C}$$

Donor acceptor balance is determined by the ratio $N_C/N_D$ which must be greater than about 0.20 to prevent semiconduction. The parameter S defines the stoichiometry of the dielectric and includes the donors and compensating ions in their expected position for substitution in the barium titanate lattice and should preferably have a value of about 1.03. If S is below about 1.02, the ceramic will generally be semiconducting, whereas if S is higher than about 1.10, dielectric constant will decrease, as is the case if NG is too high. The glass-forming oxides which form an intergranular sintering phase with the glass modifier oxides can influence stoichiometry by dissolving an unknown amount of divalent A site ions during the sintering process. Accordingly, both the amount of the sintering phase and its composition influence the final stoichiometry of the dielectric. Semiconduction can result from this effect if the value of S is at the low end of the range. If premade barium titanate is used, then its stoichiometry must also be taken into account in determining S.

C. Test Procedures

Capacitance is a measure of the capability of a material to store an electrical charge. The units of capacitance are farads or fractions thereof such as microfarads ($10^{-6}$ farad), nanofarads ($10^{-9}$ farad) or picofarads ($10^{-12}$ farad).

Dissipation Factor (DF) is a measure of the phase difference between voltage and current. In a perfect capacitor, the phase difference would be 90°. However, in practical dielectric systems, this phase difference is less than 90° by an amount $\sigma$ because of leakage and relaxation losses. In particular, DF is the tangent of the angle $\sigma$.

Insulation Resistance (IR) is a measure of the ability of a charged capacitor to withstand leakage in DC current. Insulation resistance expressed as ohm.farads ($\Omega F$) is a constant for any given dielectric regardless of capacitance.

Temperature Coefficient of Capacitance (TCC) is a measure of the change of capacitance as a function of temperature with respect to the capacitance at 25° C. Y5U and Y5V are A.E.I. specifications for TCC which permit capacitance change between $-30°$ C. and 85° C. of not more than $+22\%$, $-56\%$ and $+22\%$, $-83\%$, respectively.

Capacitance and dissipation factors were measured using a Hewlett-Packard HP4192A multi-frequency LCR meter. Insulation resistance was measured using a Hewlett-Packard 4140B pA meter after charging the capacitor for 2 mins with 100 VDC applied.

The thickness and area of the dielectric layers were measured using polished sections of the capacitors and optical microscopy. The dielectric constant was calculated using the equation:

$$K = \frac{C}{A} \cdot \frac{t}{N}$$

where
C is the capacitance of the capacitor,
A is the area of electrode in contact with the dielectric layer,
t is the thickness of the dielectric layer,
N is the number of dielectric layers.

All capacitors were aged for at least 15 hours after firing before making the electrical measurements. It is common that the capacitance and dissipation factor decrease within this time period at an aging rate characteristic of the material. Typical capacitance aging rates are 1 to 5% per decade (hrs).

D. Firing Process

Multilayer capacitors (MLCs) with internal copper electrodes are fired in a furnace which has been sealed to contain a controlled atmosphere without significant leakage. Use of atmospheres with controlled oxygen partial pressures for firing MLCs with base metal electrodes is well known. Atmospheres of $N_2$, $H_2+N_2$, $CO+CO_2+N_2$ have been described and a variety of other atmospheres including $H_2+H_2O+N_2$ and $CO_2+H_2+N_2$ can be used. An atmosphere of $CO_2+H_2+N_2$ is preferred because of both the atmosphere control provided by such a mixture and for safety reasons. Only nonexplosive levels of $H_2$ are needed, and the storage and piping of carbon monoxide are not required.

The green MLCs can be prefired at 400° C. in $N_2$ to remove most of the organic binders or the MLCs can be sintered directly without prefiring. A convenient heating rate is 25° C./min to 750° C. decreasing to 10° C./min to 1050° C. The soak period is usually 2-2.5 hours at 1050°-1065° C. and then the furnace is cooled at its natural rate. A gas mixture of $N_2+CO_2+H_2$ circulates through the furnace during the entire cycle with an adequate flow rate to maintain a slight positive pressure. Good results have been achieved for $CO_2/H_2$ ratios of 20/1 to 65/1 which produce oxygen partial pressures of $1\times10^{-9}-1\times10^{-10}$ atm at 1050° C. as verified by an oxygen sensor installed in the hot zone of the furnace. If the atmosphere is more reducing, then delamination of the MLCs is likely to occur due to premature sintering of the electrodes and/or the dielectric can become semiconducting. If the atmosphere is more oxidizing, the copper electrodes will react excessively with, or dissolve into, the dielectric. A slight reaction between the electrodes and ceramic can be beneficial to good electrode bonding but should be minimized to avoid variations in properties for differing dielectric thicknesses and differing numbers of electrodes.

It will be recognized by those skilled in the art that the use of nitrogen in the above-described gas mixture is not essential to the process and that its function is to serve merely as a diluent for the active gases.

E. Electrodes

Because of their good printing characteristics, electrode pastes used for MLCs that are fired in air usually contain an ethyl cellulose binder. However, previous experience and some preliminary experiments indicated that uniformly sintered internal copper electrodes in MLCs could not be obtained with this type of electrode paste. This was particularly the case for MLCs with a large number of layers because of the difficulty of burning out the binder from the electrodes in the center of the MLC without excessive oxidation of the outer electrodes.

Accordingly, a copper electrode paste has been developed based on an acrylic binder, which avoids the burnout problem associated with ethyl cellulose binders and which has excellent printing characteristics at low metal laydowns ($\simeq 2$ micrometers fired).

The major difficulty of using acrylic binders for screen printable electrode pastes is that the paste sticks to the screen and/or flows excessively unless low binder levels are used. At low binder levels, the solids content of the paste is high and the print deposit is usually too thick for MLC electrodes. This problem has been solved by formulating the paste with a poor solvent for acrylics, beta-terpineol. The methyl methacrylates other than butyl methacrylate cannot be dissolved in beta-terpineol even at concentrations as low as 10% by weight. However, it was found that the butyl methacrylate was readily soluble in the 20-30 wt. % concentration range. Pastes made with such a vehicle, including a small amount of surfactant (RK-5000)[1], gave very good performance with fine copper powder, such as Copper Powder #10 from Metz Corp., particularly when used with a 400-mesh screen. Excellent electrode uniformity at very thin layers (e.g., less than 3.5 microns) was achieved in fired MLCs with as many as 25 electrodes.

[1] RK-500 is a tradename of GAF for phosphate ester surfactants.

EXAMPLES

EXAMPLE 1

A first ceramic flux was made from a blend of 100.0 g boric acid, 547.5 g $BaCO_3$ and 40.0 g $MnCO_3$. These were precursors for a mixture of $3BaO.B_2O_3$ and $BaO.MnO_2$. The blended components were calcined at 700° C. for 5 hours and then ball milled to a particle size ($D_{50}$) less than 2 microns. The flux was then mixed with 85.6 g $BaTiO_3$, 10.0 g $BaZrO_3$, 1.0 g $Nd_2O_3$, 0.79 g $Nb_2O_5$, and 0.88 g $Li_2CO_3$, together with acrylic binder solution (Du Pont 5200)[2] and milled overnight. Ceramic tape was cast from the slurry and MLC capacitors (size 1209) were made using a copper paste of 1 micron copper powder dispersed in a 20% solution of Du Pont Elvacite 2044[3] in beta-terpineol. Some capacitors had five active layers (6 electrodes); others had 15 active layers (16 electrodes). The thickness was such that approximately 25 micrometers dielectric layers would result on firing. These capacitors were fired at 1050°-1065° C. in an atmosphere of $N_2+H_2+CO_2$ as described above. After firing, the chips were lightly abraded to remove a slight oxide film on the terminations, and then copper termination paste (Du Pont 7001D[4] was applied and fired to nitrogen at 700° C. Leads were attached with Pb-Sn solder in the usual way. Capacitance was 0.06 µF on the 5 layer parts and 0.15 µF for those with 15 layers with Y5V TCC. Insulation resistance exceeded 15,000 ΩF on both sets of MLCs, and DF was less than 2%. Dielectric constant appeared to be somewhat lower with the larger number of electrodes (6000 vs. 7600) indicating the possibility of some interaction of the copper electrodes with the dielectric. Nevertheless, excellent stability was obtained with 15 layer parts when tested at 200 V/mil at 125° C. for 24 hours, with zero failures out of 22 parts tested.

[2] 5200 is a tradename of E. I. du Pont de Nemours and Company, Inc. for acrylic binder casting solutions.
[3] Evacite 2044 is a tradename of E. I. du Pont de Nemours and Company for bytylmethacrylate resins.
[4] 7001D is a tradename of E. I. du Pont de Nemours and Company for thick film copper pastes.

The composition of Example 1 has the following properties:

| | | |
|---|---|---|
| S = | 1.06 | |
| $N_D$ = | 1.3% | (Nb, Nd) |
| $N_C/N_D$ = | 0.29 | [Mn/(Nb + Nd)] |
| $N_G$ = | 1.8% | (B) |
| $N_M$ = | 2.7% | (Li) |

EXAMPLE 2

A second ceramic flux was made from a blend of 45.35 wt. % ZnO, 23.0% boric acid, 20.0% $BaCO_3$ and 11.65% $MnCO_3$. These compounds were precursors for a mixture of $3ZnO.B_2O_3$ and $BaO.MnO_2$. The blended components were calcined at 700° C. for 5 hours and then milled to a particle size ($D_{50}$) less than 2 microns. Ceramic tape was prepared from a slip consisting of a blend of 2.83 g flux, 85.0 g $BaTiO_3$, 10.0 g $BaZrO_3$, 2.0 g $Nd_2O_3$ and 0.5 g $Li_2CO_3$ using the same procedure as in Example 1 above. MLCs with copper electrodes were made with five active layers; others with 25 active layers.

Capacitance was 0.06 µF for the 5 layer parts and 0.42 µF for those with 25 layers. Insulation resistance was 20,000 ΩF on both sets of MLCs and DF was less than 2%. Dielectric constant was 8500-9000 on the 5 layer MLCs and 8200-8600 on those with 25 layers. The composition of Example 2 has the following properties:

| | | |
|---|---|---|
| S = | 1.03 | |
| $N_D$ = | 1.4% | (Nd) |
| $N_C/N_D$ = | 0.29 | (Mn/Nd) |
| $N_G$ = | 1.5% | (B) |
| $N_M$ = | 3.8% | (Zn, Li) |

EXAMPLE 3
(BEST MODE)

The ceramic flux was the same as that described in Example 2, but the ceramic powder was a doped barium titanate of the following nominal composition (in parts by wt.): BaO 64.44, $TiO_2$ 29.71, $ZrO_2$ 3.86, $Nb_2O_5$ 1.51, ZnO 0.463. The composition obtained by chemical analysis was as follows: BaO 63.20, $TiO_2$ 29.50, $ZrO_2$ 3.83, $Nb_2O_5$ 1.52, ZnO 0.458, SrO 0.29. Ceramic tape was made from a blend of 40.0 g of doped barium titanate, 1.00 g of flux, 0.50 g of $BaCO_3$ and 0.050 g of $MnCO_3$. This tape was processed into MLCs with 5 active layers and copper internal electrodes as described in Example 1. The finished capacitors had a capacitance of 0.065 microfarads, DF of 1.6% and I.R. exceeded 50,000 ohm.farads. The calculated dielectric constant was 9000-10,000.

The composition of Example 3 has the following properties:

| | | |
|---|---|---|
| S = | 1.020 | (analytical) |
| | 1.027 | (nominal) |
| $N_D$ = | 1.3% | (Nb) |
| $N_C/N_D$ = | 0.35 | (Mn/Nb) |
| $N_G$ = | 1.3% | (B) |
| $N_M$ = | 2.6% | (Zn) |

EXAMPLES 4-18

Except for Examples 4-7 for which single plate capacitors were made instead of MLCs, similar procedures to those described above were used in the following examples which further illustrate the invention. Compositions are given in Table 1 and electrical data in Table 2.

Examples 4 and 5 show that addition of modifier oxide (lithium oxide or precursor) to the glass-forming oxide (boron oxide) improved sinterability but K was low without donor additions. Examples 6-10 illustrate that the addition of donor dopants to barium titanate ceramics tends to produce a semiconducting material when fired in atmospheres of low oxygen content if S is less than 1.02 and/or the acceptor level is too low. Examples 11-15 describe how a variety of donors can be used, either singly or in combination with one another. Also, Example 11 shows that other alkaline earth oxides can be included in the flux or the ceramic. Finally, Examples 16-18 describe the use of flux compositions containing silica or alumina.

TABLE 1

Dielectric Compositions

Composition (Mole)

| Ex. No. | $N_A$ BaO | $N_A$ CaO | $N_B$ TiO$_2$ | $N_B$ ZrO$_2$ | $N_D$ moles | $N_D$ Donor Ions |
|---|---|---|---|---|---|---|
| 4 | 0.3730 | 0.0558 | 0.3730 | 0.0558 | — | — |
| 5 | 0.3730 | 0.0558 | 0.3730 | 0.0558 | — | — |
| 6 | 0.3670 | 0.0558 | 0.3670 | 0.0558 | 0.0038 | Nb$^{5+}$ |
|   |        |        |        |        | 0.0037 | Nd$^{3+}$ |
| 7 | 0.3670 | 0.0558 | 0.3670 | 0.0558 | 0.0038 | Nb$^{5+}$ |
|   |        |        |        |        | 0.0037 | Nd$^{3+}$ |
| 8 | 0.4189 | — | 0.3644 | 0.0362 | 0.0119 | Nb$^{5+}$ |
| 9 | 0.3877 | 0.0363 | 0.3755 | 0.0363 | 0.0119 | Nd$^{3+}$ |
| 10 | 0.4240 | — | 0.3644 | 0.0362 | 0.0119 | Nb$^{5+}$ |
| 11 | 0.3877 | 0.0363 | 0.3755 | 0.0363 | 0.0119 | Nd$^{3+}$ |
| 12 | 0.4290 | — | 0.3644 | 0.0362 | 0.0119 | Nb$^{5+}$ |
| 13 | 0.4302 | — | 0.3670 | 0.0362 | 0.0059 | Nb$^{5+}$ |
|    |        |   |        |        | 0.0059 | Ce$^{3+}$ |
| 14 | 0.4302 | — | 0.3670 | 0.0362 | 0.0059 | Nb$^{5+}$ |
|    |        |   |        |        | 0.0059 | Sm$^{3+}$ |
| 15 | 0.4302 | — | 0.3670 | 0.0362 | 0.0119 | Nd$^{3+}$ |
| 16 | 0.4088 | — | 0.3730 | 0.0307 | 0.0119 | Nd$^{3+}$ |
| 17 | 0.4099 | — | 0.3730 | 0.0307 | 0.0119 | Nd$^{3+}$ |
| 18 | 0.4083 | — | 0.3730 | 0.0307 | 0.0119 | Nd$^{3+}$ |

Composition (Mole)

| Ex. No. | $N_C$ Mn$^{2+}$ | $N_G$ BO$_{1.5}$ | $N_G$ % | $N_M$ moles | $N_M$ modifier | $N_M$ % | $N_C$ $N_D$ | S |
|---|---|---|---|---|---|---|---|---|
| 4 | — | 0.0410 | 4.6 | — | — | 0 | 0 | 1.00 |
| 5 | — | 0.0410 | 4.5 | 0.0135 | Li | 1.5 | 0 | 1.00 |
| 6 | — | 0.0410 | 4.5 | 0.0068 | Li | 0.8 | 0 | 1.00 |
| 7 | — | 0.0410 | 4.5 | 0.0135 | Li | 1.5 | 0 | 1.00 |
| 8 | 0.0035 | 0.0126 | 1.4 | 0.0135 | Li | 3.6 | 0.29 | 1.01 |
|   |        |        |     | 0.0190 | Zn |     |      |      |
| 9 | 0.0020 | 0.0275 | 3.1 | 0.0238 | Li | 2.7 | 0.17 | 1.05 |
| 10 | 0.0035 | 0.0126 | 1.5 | 0.0135 | Li | 3.7 | 0.29 | 1.02 |
|    |        |        |     | 0.0190 | Zn |     |      |      |
| 11 | 0.0037 | 0.0275 | 3.1 | 0.0238 | Li | 2.7 | 0.31 | 1.05 |
| 12 | 0.0035 | 0.0126 | 1.4 | 0.0135 | Li | 3.7 | 0.29 | 1.03 |
|    |        |        |     | 0.0190 | Zn |     |      |      |
| 13 | 0.0034 | 0.0158 | 1.8 | 0.0238 | Li | 2.7 | 0.29 | 1.06 |
| 14 | 0.0034 | 0.0158 | 1.8 | 0.0238 | Li | 2.7 | 0.29 | 1.06 |
| 15 | 0.0034 | 0.0158 | 1.8 | 0.0238 | Li | 2.7 | 0.29 | 1.09 |
| 16 | 0.0035 | 0.0048 (B) | 0.8 | 0.0135 | Li | 3.3 | 0.29 | 1.03 |
|    |        | 0.0024 (Si) | 0.8 | 0.0146 | Zn |     |      |      |
| 17 | 0.0062 | 0.0082 | 1.0 | 0.0068 | Li | 2.7 | 0.52 | 1.03 |
|    |        |        |     | 0.0123 | Zn |     |      |      |
|    |        |        |     | 0.0041 | Al |     |      |      |
| 18 | 0.0046 | 0.0082 | 1.0 | 0.0135 | Li | 3.5 | 0.29 | 1.03 |
|    |        |        |     | 0.0123 | Zn |     |      |      |
|    |        |        |     | 0.0041 | Al |     |      |      |

TABLE 2

| Ex. No. | Number of Electrodes | K at 25° C. | DF | IR (ΩF) 25° C. | IR (ΩF) 125° C. | TCC |
|---|---|---|---|---|---|---|
| 4 | Plate capacitor | — | Porous | — | | |
| 5 | Plate capacitor | 1500 | 2.1 | <15 | <15 | — |
| 6 | Plate capacitor | — | Semi-conducting | — | | |
| 7 | Plate capacitor | — | Semi-conducting | — | | |
| 8 | 6 | — | Semi-conducting | — | | |
| 9 | 6 | — | Semi-conducting | — | | |
| 10 | 6 | 6500 | 1.7 | <1 | <1 | Y5V |
| 11 | 6 | 7100 | 3.2 | 12K | 200 | Y5V |
| 12 | 6 | 6400 | 0.5 | 25K | 1000 | Y5V |
| 13 | 6 | 6500 | 1.2 | 20K | 2000 | Y5V |
| 14 | 6 | 5600 | 0.7 | 20K | 2000 | ≅Y5U |
| 15 | 6 | 5500 | 1.2 | 40K | 1500 | Y5U |
| 16 | 6 | 5600 | 0.6 | 40K | 1500 | Y5V |
| 17 | 6 | 5400 | 0.6 | 10K | 300 | Y5V |
| 18 | 6 | 8500 | 0.6 | 20K | 2000 | Y5V |

The dielectric compositions of all of the Examples 1, 2, 3 and 11-18 fully meet the E.I.A. specification for High K Dielectric Compositions.

I claim:

1. A High K Dielectric Composition having a dielectric constant above 5,000 consisting essentially of a donor- and acceptor-doped BaTiO$_3$ which is free of fluorides and reducible oxides or their precursors having an intergranular phase of flux containing both glass-forming and glass-modifying ions, characterized stoichiometrically by the following criteria:

(a) the ratio of A site ions to B site ions in the doped BaTiO$_3$, $$\frac{N_A + N_D^{3+}}{N_B + N_D^{5+} + N_C} = 1.02-1.10,$$

wherein $N_A$ = number of divalent A site ions;
$N_B$ = number of tetravalent B site ions;
$N_C$ = number of acceptor ions; and
$N_D$ = number of donor ions of charge 3+ or 5+.

(b) the ratio of donor ions (ND) to total cations (NT), $N_D/N_T = 0.5-3.0\%$;

(c) $N_C/N_D$ is at least 0.20;

(d) the ratio of glass-forming ions (NG) to total cations, $N_G/N_T = 0.5-3.5\%$; and (e) The ratio of the glass-modifying ions, $N_M$, to the total number of cations (NT), $N_M/N_T = 1.5-5.0\%$.

2. The dielectric composition of claim 1 in which the glass-forming ions are selected from B$^{3+}$, Si$^{4+}$, Ge$^{4+}$, P$^{5+}$ and mixtures thereof.

3. The dielectric composition of claim 1 in which the glass-modifying ions are selected from Li$^+$ and Zn$^{2+}$, and mixtures thereof.

4. The dielectric composition of claim 1 in which the divalent A site ions are selected from Ba$^{2+}$, Ca$^{2+}$, Sr$^{2+}$, Mg$^{2+}$, and mixtures thereof.

5. The dielectric composition of claim 1 in which the tetravalent B site ions are selected from Ti$^{4+}$, Zr$^{4+}$ and mixtures thereof.

6. The dielectric composition of claim 1 in which the donor ions are selected from Nb$^{5+}$, Ta$^{5+}$, trivalent rare earth ions and mixtures thereof.

7. The dielectric composition of claim 1 in which the donor compensating ions are selected from Mn$^{2+}$, Mn$^{3+}$, Ni$^{2+}$, Cr$^{3+}$, Co$^{2+}$, Co$^{3+}$ and mixtures thereof.

8. A composition for preparing donor- and acceptor-doped BaTiO$_3$ having an intergranular layer of flux containing both glass-forming and glass-modifying ions by firing in a low oxygen-containing atmosphere consisting essentially of an admixture of finely divided particles of oxides of BaTiO$_3$, oxides of glass-forming cations, oxides of glass-modifying cations, A site dopant oxide(s), B site dopant oxide(s), oxides of donor ions and oxides of donor compensating ions, characterized stoichiometrically by the following criteria:

(a) the molar ratio of A site oxide(s) to B site oxide(s) is 1.02–1.10;

(b) the molar ratio of donor oxide(s) to total oxide(s) is 0.5 to 3.0%;

(c) the molar ratio of donor-compensating oxide(s) to donor oxide(s) is at least 0.20;

(d) the molar ratio of glass-forming oxide(s) to total oxide(s) is 0.5 to 3.5%; and (e) the molar ratio of the glass-modifying oxide(s) to the total oxide(s) is 1.5–5.0%.

9. The composition of claim 8 in which A site dopant ions, B site dopant ions, oxides of donor ions and oxides of acceptor ions are incorporated within barium titanate during manufacture.

10. A dielectric composition having a dielectric constant above 5000 consisting essentially of a donor- and acceptor-doped BaTiO$_3$ which is free of fluorides, reducible oxides and precursors thereof having an intergranular phase of flux containing both glass-forming and glass-modifying ions, characterized stoichiometrically by the following criteria:

(a) the ratio of A site ions to B site ions in the doped BaTiO$_3$, $$\frac{N_A + N_D^{3+}}{N_B + N_D^{5+} + N_C} = 1.02\text{--}1.10$$

wherein $N_A$ = number of divalent A site ions;

$N_B$ = number of tetravalent B site ions;

$N_C$ = number of acceptor ions; and $N_D$ = number of donor ions;

(b) The ratio of donor ions ($N_D$) to total cations ($N_T$), $N_D/N_T = 0.5\text{--}3.0\%$;

(c) $N_C/N_D$ is at least 0.20;

(d) The ratio of glass-forming ions ($N_G$) to total cations ($N_T$), $N_G/N_T = 0.5\text{--}3.5\%$; and (e) the ratio of glass-modifying ions $N_M$ to the total number of cations ($N_T$), $N_M/N_T = 1.5\text{--}5.0\%$.

* * * * *